June 5, 1923.

W. M. FRASER

CALCULATOR

Filed April 15, 1922

WITNESSES

INVENTOR
William M. Fraser
BY
ATTORNEYS

Patented June 5, 1923.

1,458,045

UNITED STATES PATENT OFFICE.

WILLIAM MORRISON FRASER, OF PERTH AMBOY, NEW JERSEY.

CALCULATOR.

Application filed April 15, 1922. Serial No. 553,136.

*To all whom it may concern:*

Be it known that I, WILLIAM M. FRASER, a citizen of the United States, and a resident of Perth Amboy, in the county of Middlesex and State of New Jersey, have invented a new and Improved Calculator, of which the following is a full, clear, and exact description.

This invention relates to improvements in calculators, an object of the invention being to provide a calculator which will greatly facilitate the calculations incidental to the sale of oil or other liquids by liquid measure.

In the oil industry oil is sometimes sold by weight and sometimes sold by measure. It is customary in the trade, or at least generally recognized that oil sold by measure is presumed to be at a temperature of 60° Fahrenheit when the measuring takes place. It is very often either impractical or impossible to measure oil while it is at this exact temperature. Changes in temperature naturally cause expansion of oils of different kinds, or in other words, cause a variation of their specific and Baumé gravities. It is therefore necessary when oil is sold at temperatures other than 60° to make allowance for this expansion or contraction.

It has heretofore been necessary in order to facilitate calculations for variation and others incidental thereto to refer to large and cumbersome books containing scales of variation and of equivalent.

An object of this invention therefore is to provide a calculator with which equivalents on the Baumé and specific gravity scales may be told at a glance.

A further object is to provide a calculator with which the amount of change in specific gravity of oils due to temperature changes may be directly read, and to provide a calculator which will be simple in construction and operation, which will occupy a very small space, and which will lend itself to economical manufacture.

With these and other objects in view, the invention consists in certain novel features of construction and combinations and arrangements of parts as will be more fully hereinafter described and pointed out in the claims.

In the accompanying drawings:—

Figure 1:
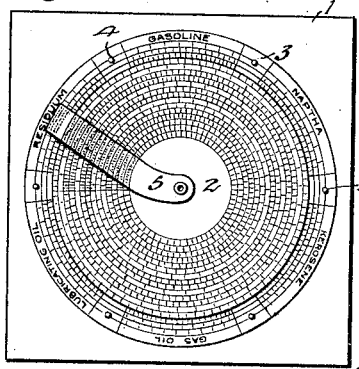
Figure 1 is a plan view of my improved calculator.
Figure 2:
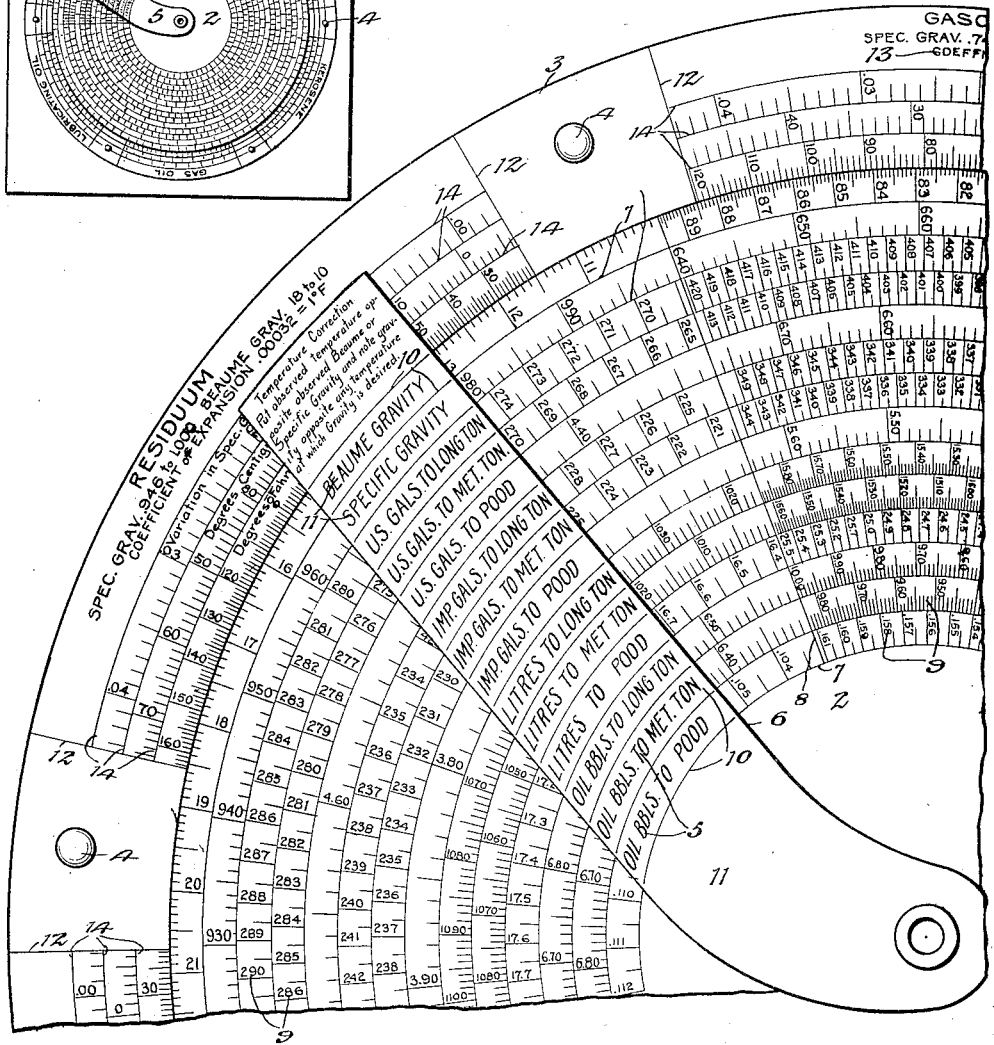
Figure 2 is an enlarged fragmentary plan view showing a portion thereof.

Referring in detail to the drawings, I have used the reference numeral 1 to indicate a support, upon which a disk 2 and a ring 3 concentric with and encircling the disk are mounted for movement relative to each other. Preferably the ring is movable, certain studs or handles 4 being provided to facilitate its manual turning, but it is enough that the disk and ring be relatively movable.

Pivoted at its inner end to the center of the disk 2 is an indicating arm 5 shaped to provide a radially disposed reading edge 6.

The disk 2 is ruled to provide a plurality of concentric equidistantly spaced circles 7, intersected by a common radial line 8, and each of the circular lines is graduated, as indicated at 9. The two outermost series of graduations may be read on the reading edge of the arm to give equivalents in specific gravity and Baumé, the outer ring being graduated from .640 to 1. specific gravity to cover the specific gravities of all petroleum oils at all temperatures. Corresponding Baumé graduations are provided on the adjacent circle.

The arm 5 is ruled with a plurality of transversely extending arcuate lines 10 coinciding with the circles 7 and between the lines 10, suitable indicia 11 is displayed which explains the graduations of the circles or rings. " Baumé gravity " and " Specific gravity " are displayed of course upon the two outer subdivisions of the arm.

The inner concentric circles 7 are all graduated to represent equivalents of measures to weights such as U. S. gallons to a metric ton, Imperial gallons to a metric ton, Litres to a pood, etc. so that by reading along the edge of the arm the number of measures of oil contained in any weight may be determined when the specific gravity of the oil is known. The indicia 11 on the arm explain these equivalents.

It is not always convenient in handling oil to test its specific gravity, although its temperature may be readily determined, and since the specific gravity of any oil at a temperature of 60° Fahrenheit is used as a standard and well known in the trade, the movable ring 3 is so graduated that the specific or Baumé gravity of any oil may be determined when its temperature is known and also that a direct reading of the variation in specific gravity or Baumé, due to the change in volume caused by a variation in temperature.

The outer ring is therefore radially subdivided by a plurality of radial line 12 into six main arcuate spaces equidistantly spaced apart and each having displayed respectively therein the words "Gasoline", "Naphtha", "Kerosene", "Gas oil", "Lubricating oil", and "Residuum" so that the graduations in each space on the ring refers to a particular kind of petroleum oil. The coefficient of expansion of each oil is preferably prominently displayed under the name of the oil, as indicated at 13. It will be readily understood that the spaces between the major subdivisions of the movable ring 3 are to make the calculator operative by allowing for this expansion.

Ruled arcuate lines 14 divide the main subdivisions of the ring 3 longitudinally and upon the two inner lines of each subdivision equivalent temperature scales of Fahrenheit and centigrade are displayed.

Upon the outermost of these lines, a scale representing the variation in specific gravity due to temperature change is displayed. These scales and the gravity scales on the stationary ring are of course arranged in accordance with the coefficients of expansion of the different oils.

The manner of using the device is as follows:

Assuming it is desired to sell a long ton of residuum in barrels and the temperature of the residuum is found to be 70° Fahrenheit at the time of barreling. The specific gravity of residuum at 60° is roughly about .975. The ring 3 is moved until 60° of the residuum temperature scale registers with .975 on the specific gravity scale where it will be seen by referring to the barrel to ton graduation on the ring that 6.57 barrels are equivalent to a long ton when the residuum is at 60°. However, by moving the arm to 70° the purchaser should get 6.6 barrels for a ton in order to get full measure. By referring to the outermost scale on the movable ring it can be seen that this temperaure change has caused a variation of approximately .005 in the specific gravity of the oil.

It will of course be apparent that the disk could be graduated from weights to measures instead of measures to weights.

I have illustrated one of the preferred embodiments of the invention, but numerous slight changes and alterations might be made in the general form and arrangement of the parts described without departing from the invention, and hence I do not wish to limit myself to the precise details set forth, but shall consider myself at liberty to make slight changes and alterations as fairly fall within the spirit and scope of the appended claims.

I claim:

1. In a calculator, a disk ruled to provide a plurality of concentric graduated circles, a radially disposed indicating arm ruled with transverse arcuate lines coinciding with the circles, said arm adapted to be read simultaneously upon the graduations of the two outer circles, and the graduations of any one of the inner circles to indicate on the inner circle the equivalents in weights and measures of a liquid when its density is indicated on the outer circles.

2. In a calculator, a disk ruled to provide a plurality of concentric graduated circles, a radially disposed indicating arm ruled with transverse arcuate lines coinciding with the circles, said arm adapted to be read simultaneously upon the graduations of the two outer circles, and the graduations of any one of the inner circles to indicate on the inner circle the equivalents in weights and measures of a liquid when its density is indicated on the outer circles, a ring encircling and movable about the disk, said ring having temperature graduations thereon facilitating the setting of the arm to indicate liquid density.

3. In a calculator, a disk ruled to provide a plurality of concentric graduated circles, a radially disposed indicating arm ruled with transverse arcuate lines coinciding with the circles, said arm adapted to be read simultaneously upon the graduations of the two outer circles, and the graduations of any one of the inner circles to indicate on the inner circle the equivalents in weights and measures of a liquid when its density is indicated on the outer circles, a ring encircling and movable about the disk, said ring having temperature graduations thereon facilitating the setting of the arm to indicate liquid density, said ring being provided with other graduations associated with the temperature scales to give a direct reading of variation of specific gravity due to temperature change.

WILLIAM MORRISON FRASER.